No. 741,262. PATENTED OCT. 13, 1903.
J. A. LEIGHTON.
FEED MEASURE AND BOX.
APPLICATION FILED AUG. 28, 1902.
NO MODEL. 2 SHEETS—SHEET 2.
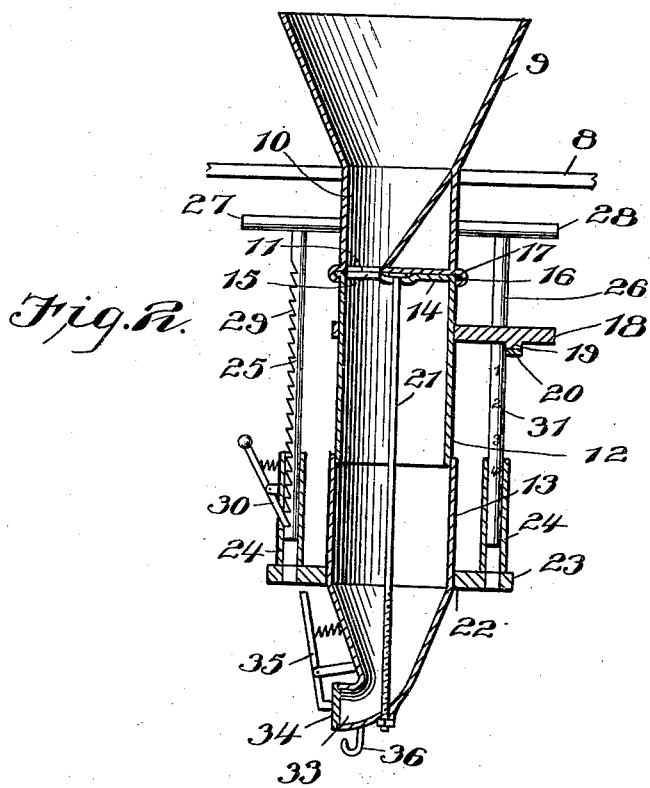
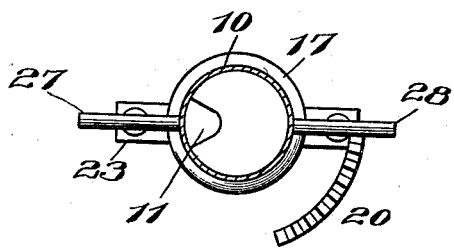
WITNESSES:
INVENTOR
J. A. Leighton
Attorneys No. 741,262. Patented October 13, 1903.

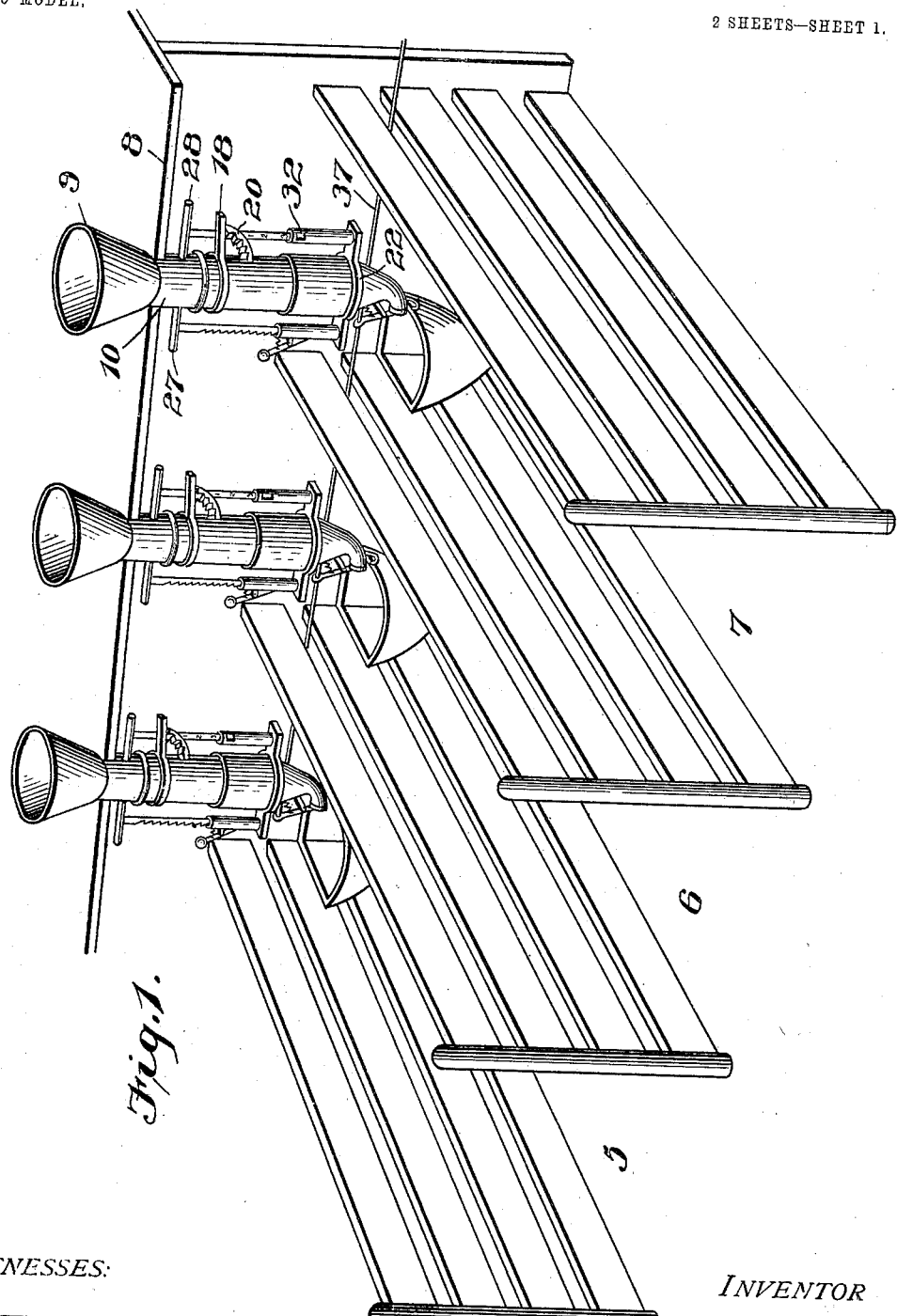

UNITED STATES PATENT OFFICE.

JAMES A. LEIGHTON, OF CROWLEY, LOUISIANA.

FEED MEASURE AND BOX.

SPECIFICATION forming part of Letters Patent No. 741,262, dated October 13, 1903.

Application filed August 28, 1902. Serial No. 121,368. (No model.)

*To all whom it may concern:*

Be it known that I, JAMES A. LEIGHTON, a citizen of the United States, residing at Crowley, in the parish of Acadia, State of Louisiana, have invented certain new and useful Improvements in Feed-Measures; and I do hereby declare the following to be a full, clear, and exact description of the invention, such as will enable others skilled in the art to which it appertains to make and use the same.

This invention relates to apparatus for use in feeding stock; and it has for its object to provide a construction wherein the quantity to be fed to each head of stock will be accurately measured and wherein the feed may be fed to the stalls of the several heads of stock simultaneously and from a distant point.

Other objects and advantages of the invention will be understood from the following description.

In the drawings forming a portion of this specification, and in which like numerals of reference indicate similar parts in the several views, Figure 1 is a view showing a series of stalls equipped with a mechanism for delivering the feed thereto simultaneously from a distant point. Fig. 2 is a vertical section through the equipment of one of the stalls with the feed-box hanging thereto. Fig. 3 is a transverse section through the feed-box.

Referring now to the drawings, there is shown a series of stalls 5, 6, and 7, and on the floor 8 above the stalls are the hoppers 9, into which the feed to be fed is placed, each hopper having a chute 10 leading therefrom through the floor 8 at a point above the corresponding stall or feed-trough, and in the bottom of the chute 10 is a segmental opening 11, to which the sides of the interior of the chute converge, the outer surface of the chute being cylindrical, as indicated.

In connection with the chute 10 is a telescoping measure comprising the upper and lower cylindrical members 12 and 13, the member 12 having a closure 14 at its upper end, in which is a segmental opening 15, which is adapted to register at times with the opening 11 to communicate the chute 10 with the measure. The member 12 of the measure has a flange 16, which engages a grooved bead 17 at the lower end of the chute 10, so that the member 12 may be freely rotated or oscillated, and to facilitate such oscillation member 12 is provided with a handle 18. The handle 18 has a knife-edge 19, which moves over the notched segment 20 as the handle is operated, and by engaging the knife-edge in a notch of the segmental plate 20 the member 12 is held against accidental rotation. The members 12 and 13 are further held together by a bolt 21, passed through the adjacent ends and centrally thereof.

The member 12 slides inside of the member 13, and the member 13 is held in a collar, 22, having radiating ears 23, to which are connected the parallel tubular uprights 24. The uprights 24 have the bars 25 and 26, slidably engaged in their upper ends, and which bars are connected to the arms 27 and 28, which radiate from the chute 10. Thus the member 13 may be raised and lowered, and at the same time the bars 25 and 26 will be moved into and out of the uprights 24. The bar 25 has the rack 29 formed thereon, the teeth of which are directed upwardly, and pivoted to the upright 24 is the spring pawl or latch 30, the lower end of which is passed through an opening in the upright and engaging the rack to hold the member 13 at different elevations. When the member 13 is pushed upwardly, the pawl slides over the rack, and when the member is to be moved downwardly to increase the capacity of the measure the pawl is first actuated to disengage the rack.

The rod 26 is provided with a scale 31, and in the side of the upright 24 is an opening 32, through which the numbers of the scale are perceptibly visible, and when the measure is to be adjusted to a certain capacity the member 13 is raised or lowered, as required, until the figure representing that capacity is visible through the opening.

The lower end of the member 13 is tapered and terminates in a spout 33, having a cover 34, which is held normally in closed position by a spring-pressed lever 35, the spout being provided with a hook 36 to receive a box or bucket, into which the feed is to be discharged. With this construction it will be seen that when a definite quantity of feed is to be drawn the member 13 is set in corresponding relation to the member 12, and the member 12 is then rotated to first communicate with the chute 10 and then cut off such communication after the measure has filled from the chute. The lever 35 is then operated to open the spout of the member 13 and permit the feed to run into the receptacle.

In Fig. 1 of the drawings the separate feed-boxes are each provided with an apparatus such as described, and the measures may be filled at any time during the day and at the proper hour. The levers 35 may be simultaneously operated from a distant point through the medium of a cord 37, which is connected with all of the levers.

It will be understood that in practice modification of the specific constructions shown may be made and that any suitable materials and proportions may be used for the various parts without departing from the spirit of the invention.

What is claimed is—

1. The combination with a plurality of stalls and their feed-troughs, of a hopper for each stall having a discharge-chute, a measuring device connected to each chute, each chute and its measuring device having openings for registration to communicate them and each measuring device being movable to carry its opening into and out of registration with the openings of its chute, a discharge-valve for each measuring device having an operating-lever and a cord connected with all of the levers for actuating them simultaneously.

2. A device of the class described comprising a hopper having a discharge-chute, and a measuring device connected to the chute said chute and measuring device having openings for registration to communicate them and the measuring device being movable to carry its opening into and out of registration with the opening of the chute.

3. A device of the class described comprising a hopper having a chute, a telescopic measuring device connected to the chute to receive therefrom and a valve mechanism for communicating the chute with the measuring device at times.

4. A device of the class described comprising a hopper having a chute provided with a discharge-opening a measuring device comprising telescoping members one of which is connected to the chute rotatably and has an opening for movement into and out of registration with the opening of the chute, tubular uprights connected to the lower members of the measuring device, a rack-bar connected to the chute and slidably engaged in one of the uprights, a pawl upon said upright for engagement with the rack-bar, and a second bar attached to the chute and slidably engaged in the second upright, the second bar having a scale marked thereon.

In testimony whereof I affix my signature in presence of two witnesses.

JAMES A. LEIGHTON.

Witnesses:
GEORGE KUTSCH,
A. PERCY HOLT.